United States Patent
Tomofuji

(10) Patent No.: US 11,016,710 B2
(45) Date of Patent: May 25, 2021

(54) IMAGE FORMING APPARATUS THAT RECEIVES JOB DATA FROM HOST APPARATUSES VIA SWITCHING HUB AND CALCULATES COMMUNICATION SPEED FOR THE HOST APPARATUSES BASED ON THE JOB DATA AND RECEPTION REQUIRED TIME

(71) Applicant: KYOCERA Document Solutions Inc., Osaka (JP)

(72) Inventor: Shinji Tomofuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/938,651

(22) Filed: Jul. 24, 2020

(65) Prior Publication Data
US 2021/0034309 A1  Feb. 4, 2021

(30) Foreign Application Priority Data
Aug. 1, 2019  (JP) .............................. JP2019-142061

(51) Int. Cl.
*G06F 3/00*    (2006.01)
*G06F 3/12*    (2006.01)
*H04N 1/333*   (2006.01)

(52) U.S. Cl.
CPC .......... *G06F 3/1231* (2013.01); *G06F 3/1204* (2013.01); *G06F 3/1254* (2013.01); *H04N 1/33323* (2013.01)

(58) Field of Classification Search
None
See application file for complete search history.

(56) References Cited

U.S. PATENT DOCUMENTS

2012/0176635 A1*  7/2012  Niitsuma .............. G06F 3/1236
                                            358/1.13

FOREIGN PATENT DOCUMENTS

JP         2013197760 A      9/2013

OTHER PUBLICATIONS

Machine Translation in English of JP Pub 2013-197760 to Sawada Yoshihito.*

* cited by examiner

*Primary Examiner* — Haris Sabah
(74) *Attorney, Agent, or Firm* — Alleman Hall Creasman & Tuttle LLP

(57) ABSTRACT

An image forming apparatus includes a speed calculating portion and a communication setting portion. In a state where a communication with the switching hub has been established by a highest-speed candidate method among a plurality of candidate methods that respectively have different rated communication speeds, the speed calculating portion calculates a result communication speed for each of the one or more host apparatuses based on an amount of received job data and a reception required time for each of the one or more host apparatuses, wherein the candidate methods are candidates for a communication method to be adopted. The communication setting portion selects, as an adopted communication method, one of the plurality of candidate methods based on the result communication speed for each of the one or more host apparatuses, and establishes a communication with the switching hub by the adopted communication method.

3 Claims, 2 Drawing Sheets

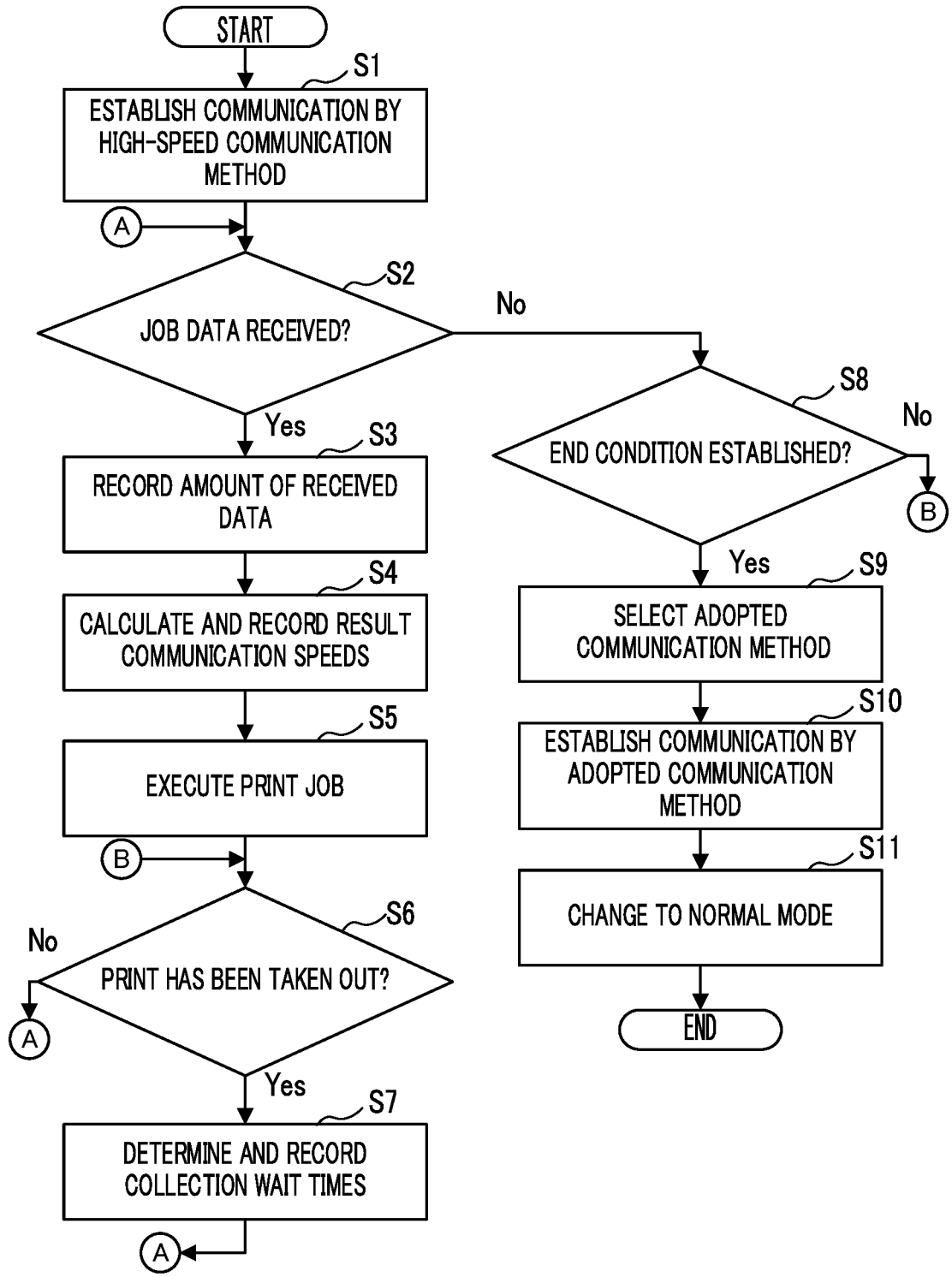

IMAGE FORMING APPARATUS THAT RECEIVES JOB DATA FROM HOST APPARATUSES VIA SWITCHING HUB AND CALCULATES COMMUNICATION SPEED FOR THE HOST APPARATUSES BASED ON THE JOB DATA AND RECEPTION REQUIRED TIME

INCORPORATION BY REFERENCE

This application is based upon and claims the benefit of priority from the corresponding Japanese Patent Application No. 2019-142061 filed on Aug. 1, 2019, the entire contents of which are incorporated herein by reference.

BACKGROUND

The present disclosure relates to an image forming apparatus that receives job data from a host apparatus via a switching hub.

Typically, an image forming apparatus receives job data from a host apparatus such as a personal computer via a LAN (Local Area Network), and executes a print process based on the job data. In addition, there is a case where an image forming apparatus receives job data from a host apparatus via a relay apparatus such as a switching hub.

The switching hub is configured to selectively adopt one of a plurality of communication methods that respectively have different rated communication speeds, for each of ports to which communication terminals such as the image forming apparatus and the host apparatus are connected, and make a communication by the adopted communication method.

In addition, the image forming apparatus may also have a function to selectively adopt one of the plurality of communication methods that respectively have different rated communication speeds, and make a communication by the adopted communication method. The plurality of communication methods include 1000BASE-T and 100BASE-TX.

In general, the image forming apparatus has a lower power consumption when it adopts a low-speed communication method than when it adopts a high-speed communication method.

In addition, there is known a technology in which an image forming apparatus is configured to communicate with one or more terminals via a router, and transmit, to each of the terminals, information for setting a communication speed in a transmission path between the terminal and the router based on a use state where the terminal uses the image forming apparatus during a predetermined time period.

Meanwhile, from the viewpoint of power saving, the image forming apparatus desirably adopts a low-speed communication method. On the other hand, from the viewpoint of improving the convenience of users, the image forming apparatus desirably adopts a high-speed communication method.

SUMMARY

An image forming apparatus according to an aspect of the present disclosure receives job data from one or more host apparatuses via a switching hub and executes a print process based on the job data. The image forming apparatus includes a speed calculating portion and a communication setting portion. In a state where a communication with the switching hub has been established by a highest-speed candidate method among a plurality of candidate methods that respectively have different rated communication speeds, the speed calculating portion calculates a result communication speed for each of the one or more host apparatuses based on an amount of received job data and a reception required time for each of the one or more host apparatuses, wherein the candidate methods are candidates for a communication method to be adopted. The communication setting portion selects, as an adopted communication method, one of the plurality of candidate methods based on the result communication speed for each of the one or more host apparatuses, and establishes a communication with the switching hub by the adopted communication method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a flowchart showing an example of a procedure of a job control in a communication adjustment mode in the image forming apparatus according to the embodiment of the present disclosure.

DETAILED DESCRIPTION

Figure 1:
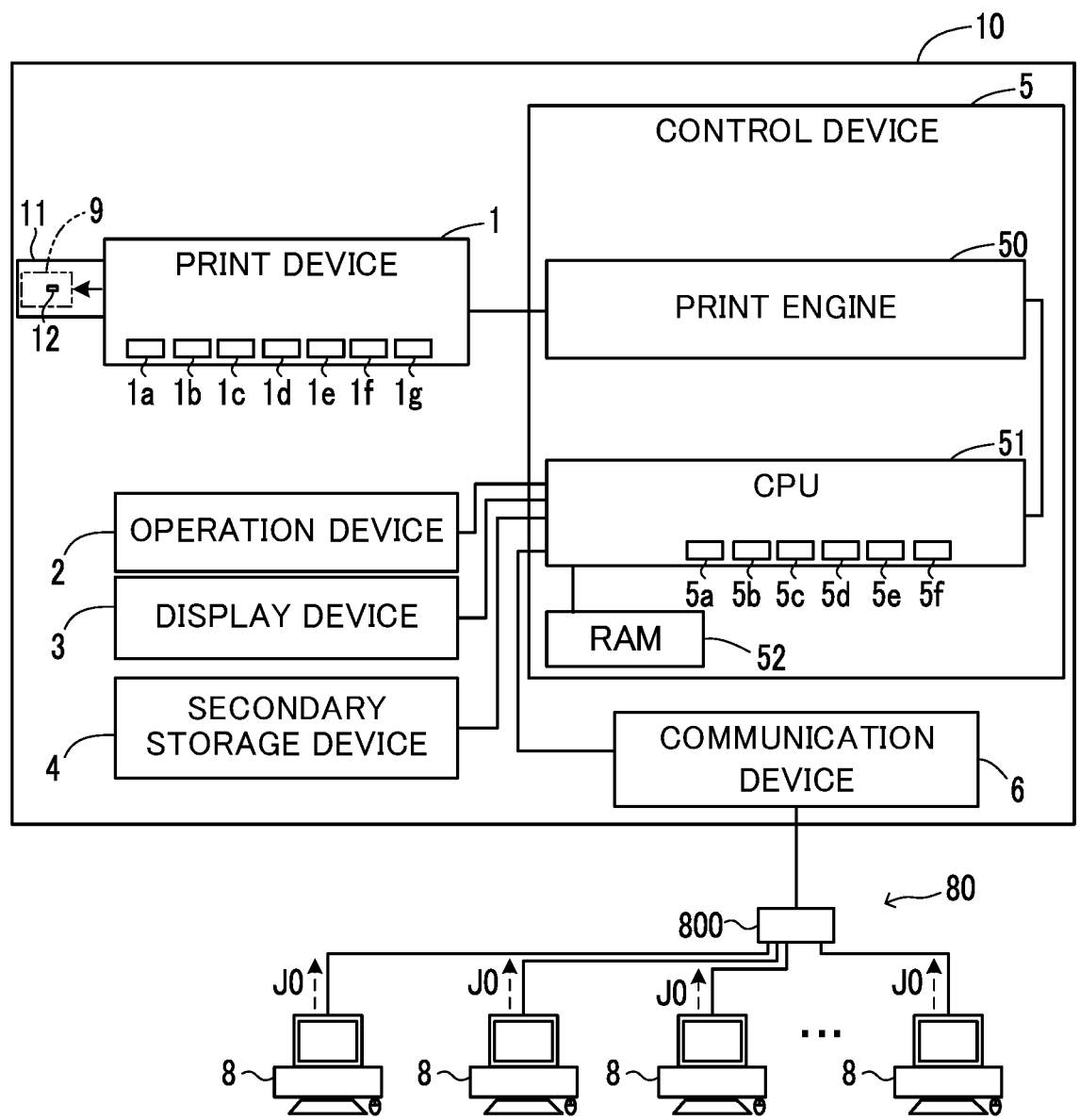
FIG. 1 is a block diagram showing a configuration of an image forming apparatus according to an embodiment of the present disclosure.

The following describes an embodiment of the present disclosure with reference to the accompanying drawings. It should be noted that the following embodiment is an example of a specific embodiment of the present disclosure and should not limit the technical scope of the present disclosure.

Configuration of Image Forming Apparatus 10

An image forming apparatus 10 according to the embodiment of the present disclosure includes a print device 1 configured to execute a print process to form an image on a sheet. The image forming apparatus 10 discharges a print 9 that is the sheet on which the image has been formed, onto a discharge tray 11.

The image forming apparatus 10 is configured to communicate with other apparatuses, such as one or more host apparatuses 8, via a LAN 80. The host apparatuses 8 are computers configured to communicate with the image forming apparatus 10.

In the present embodiment, the image forming apparatus 10 receives job data J0 from one or more host apparatuses 8 via a switching hub 800, and executes the print process based on the received job data J0. The job data J0 includes image data representing a target image of the print process.

As shown in FIG. 1, the image forming apparatus 10 includes a print device 1, an operation device 2, a display device 3, a secondary storage device 4, a control device 5, and a communication device 6.

The operation device 2 is configured to receive user operations, and includes, for example, a return button and a touch panel. The display device 3 includes a display panel, such as a liquid crystal panel, that displays information.

The communication device 6 is a communication interface device configured to make communications with other apparatuses such as the host apparatuses 8 via the LAN 80. All of the data transmissions and receptions to/from the other apparatuses are performed via the communication device 6 by the control device 5.

The secondary storage device 4 is a computer-readable nonvolatile storage device. The secondary storage device 4 is configured to store programs and various types of data. For example, either a hard disk drive or a SSD (Solid State Drive) or a combination thereof may be adopted as the secondary storage device 4.

The print device 1 executes the print process by a predetermined method such as an electrophotographic method or an inkjet method.

For example, in a case where the print device 1 executes the print process by the electrophotographic method, the print device 1 includes a sheet conveying mechanism 1a, a photoconductor 1b, a charging device 1c, a laser scanning unit 1d, a developing device 1e, a transfer device 1f, and a fixing device 1g.

The sheet conveying mechanism 1a conveys the sheet along a predetermined path. The charging device 1c electrically charges a surface of the photoconductor 1b. The laser scanning unit 1d writes an electrostatic latent image on the charged surface of the photoconductor 1b.

The developing device 1e develops the electrostatic latent image on the photoconductor 1b into a toner image. The transfer device 1f transfers the toner image from the photoconductor 1b to the sheet. The fixing device 1g fixes the toner image on the sheet to the sheet by heating the toner image.

The sheet conveying mechanism 1a discharges onto the discharge tray 11 the print 9, the sheet that has passed through the fixing device 1g. The discharge tray 11 receives the print 9 that has been obtained by the execution of the print process.

The image forming apparatus 10 further includes a print sensor 12 configured to detect the print 9 on the discharge tray 11. For example, the print sensor 12 is a photosensor that detects a displacement of an actuator caused by the load of the print 9, or a limit switch.

The control device 5 executes various types of calculations, data processing, and control of various types of electric devices included in the image forming apparatus 10. The control device 5 is configured to transmit and receive data and control signals to/from the print device 1, the display device 3, and the communication device 6. Furthermore, the control device 5 inputs from the operation device 2 an operation signal that represents the content of an operation performed on the operation device 2.

The control device 5 includes a print engine 50, a CPU 51, and a RAM (Random Access Memory) 52. The print engine 50 causes the print device 1 to execute the print process by controlling the print device 1 in accordance with a command from the CPU 51.

The print engine 50 is implemented by a processor such as an MPU (Micro Processing Unit) or a DSP (Digital Signal Processor), or a circuit such as an ASIC (Application Specific Integrated Circuit) that are not shown.

The CPU 51 is a processor configured to execute various types of data processing and perform control by executing the programs stored in the secondary storage device 4. It is noted that another processor, such as the DSP, may execute the data processing and perform the control in place of the CPU 51.

The RAM 52 is a volatile storage device configured to primarily store: the programs executed by the CPU 51; and data that is output or consulted by the CPU 51 during execution of the programs.

The CPU 51 operates as a main control portion 5a, a job control portion 5b and the like when it executes the programs.

The main control portion 5a mainly controls the display device 3 and the communication device 6. The job control portion 5b mainly controls the print engine 50.

For example, when the communication device 6 has received the job data J0 from a host apparatus 8, the job control portion 5b outputs a print command to the print engine 50. The print engine 50 causes the print device 1 to execute the print process in accordance with the print command based on the job data J0.

The switching hub 800 is configured to selectively adopt one of a plurality of communication methods that respectively have different rated communication speeds, for each of ports to which communication terminals such as the image forming apparatus 10 and the host apparatuses 8 are connected, and make a communication by the adopted communication method.

In addition, the communication device 6 of the image forming apparatus 10 also has a function to selectively adopt one of the plurality of communication methods that respectively have different rated communication speeds, and make a communication by the adopted communication method. In the present embodiment, the plurality of communication methods include 1000BASE-T and 100BASE-TX.

The communication device 6 has a lower power consumption when it adopts 100BASE-TX that is a low-speed communication method than when it adopts 1000BASE-T that is a high-speed communication method.

Meanwhile, from the viewpoint of power saving, the image forming apparatus 10 desirably adopts a low-speed communication method such as 100BASE-TX. On the other hand, from the viewpoint of improving the convenience of users, the image forming apparatus 10 desirably adopts a high-speed communication method such as 1000BASE-T.

The CPU 51 of the image forming apparatus 10 executes a job control in a communication adjustment mode described below to automatically set a communication method for the communication with the switching hub 800. This makes it possible for the image forming apparatus 10 to secure the convenience of the user while achieving power saving.

In the present embodiment, the CPU 51 also operates as a speed calculating portion 5c, a collection wait time determining portion 5d, and a communication setting portion 5e when it executes the programs.

When a predetermined adjustment start condition is satisfied, the main control portion 5a changes the operation mode from the normal mode to the communication adjustment mode. The communication setting portion 5e starts the job control shown in FIG. 2 when the operation mode is the communication adjustment mode.

For example, the adjustment start condition is composed of: a condition that a predetermined number of days have passed since the day on which ended the job control in the communication adjustment mode of the last time; a condition that no job data J0 to be processed is left; and a condition that the image forming apparatus 10 is not making a communication with another apparatus.

Furthermore, the adjustment start condition may include, as a prerequisite, a condition that the current time is in a predetermined time zone.

Job Control in Communication Adjustment Mode

The following describes an example of the procedure of the job control in the communication adjustment mode with reference to the flowchart shown in FIG. 2. In the following description, S1, S2, ... are identification signs representing a plurality of steps of the job control.

Step S1

In the job control, the communication setting portion 5e causes the communication device 6 to execute a process to establish a communication by the high-speed communication method with the switching hub 800. This allows a communication by 1000BASE-T to be made at least between the image forming apparatus 10 and the switching hub 800.

The high-speed communication method is one of a plurality of candidate methods that have different rated communication speeds, the candidate methods being candidates for the communication method to be adopted. In the present embodiment, the communication method adopted in the communication device 6 is selected from two candidate methods. In the present embodiment, the two candidate methods are the high-speed communication method and the low-speed communication method. As described above, the high-speed communication method is 1000BASE-T, and the low-speed communication method is 100BASE-TX.

The processes of steps S2 to S9 described below are executed in a state where a communication with the switching hub 800 has been established by the highest-speed candidate method among the plurality of candidate methods that respectively have different rated communication speeds.

It is noted that in a case where the communication method established between the image forming apparatus 10 and the switching hub 800 at a time point when the operation mode has been changed from the normal mode to the communication adjustment mode is the high-speed communication method, the process of step S1 is skipped.

Step S2

Next, the main control portion 5a confirms whether or not the job data J0 has been received from a host apparatus 8. In a case where it is confirmed that the job data J0 has been received from a host apparatus 8, the main control portion 5a moves the process to step S3. Otherwise, the main control portion 5a moves the process to step S8.

Step S3

In step S3, the speed calculating portion 5c records, to the secondary storage device 4, information of the amount of received data of the job data J0 for each of the host apparatuses 8, and moves the process to step S4.

Specifically, the speed calculating portion 5c records host identification information and the information of the amount of received data in association with each other onto the secondary storage device 4, the host identification information identifying the host apparatus 8 that is the transmission source of the job data J0.

It is noted that the speed calculating portion 5c measures a reception required time that is a time required for the communication device 6 to receive the job data J0.

Step S4

In step S4, the speed calculating portion 5c calculates, for each of the host apparatuses 8, a result communication speed and records the calculated result communication speed onto the secondary storage device 4 for each of the host apparatuses 8. After this, the speed calculating portion 5c moves the process to step S5.

The speed calculating portion 5c calculates the result communication speed based on the amount of received data and the reception required time. Furthermore, the speed calculating portion 5c records the information of the result communication speed onto the secondary storage device 4 in association with the host identification information identifying the host apparatus 8 that is the transmission source of the job data J0.

In the communication adjustment mode, the switching hub 800 makes a communication with the image forming apparatus 10 by the high-speed communication method. On the other hand, the switching hub 800 may not be able to make a communication with the host apparatus 8 at a communication speed corresponding to the high-speed communication method.

For example, in a case where the host apparatus 8 has adopted the low-speed communication method, the switching hub 800 performs a communication with the host apparatus 8 by the low-speed communication method. In this case, with regard to the effective speed of the communication at the communication path from the host apparatus 8 to the image forming apparatus 10, the low-speed communication method adopted in the host apparatus 8 becomes a bottleneck.

In addition, there may be a case where another hub adopting a communication method other than the high-speed communication method exists between the host apparatus 8 and the switching hub 800. In this case, with regard to the effective speed of the communication at the communication path from the host apparatus 8 to the image forming apparatus 10, a communication method of the lowest-speed communication device in the communication path from the host apparatus 8 to the switching hub 800 becomes a bottleneck.

Step S5

In step S5, the job control portion 5b controls the print engine 50 to cause the print device 1 to execute the print process based on the job data J0. Thereafter, the job control portion 5b moves the process to step S6.

With the process of step S5, a print 9 corresponding to the received job data J0 is discharged onto the discharge tray 11. In addition, the print sensor 12 detects the print 9 on the discharge tray 11.

Step S6

In step S6, the collection wait time determining portion 5d determines, upon a change in the detection result of the print sensor 12 after the execution of the print process, whether or not the print 9 has been taken out from the discharge tray 11.

That is, in a case where the print sensor 12 detects the print 9 after the execution of the print process, and then the print sensor 12 does not detect the print 9, the collection wait time determining portion 5d determines that the print 9 has been taken out from the discharge tray 11.

Upon determining that the print 9 has been taken out from the discharge tray 11, the collection wait time determining portion 5d moves the process to step S7. Otherwise, the collection wait time determining portion 5d moves the process to step S2.

Step S7

In step S7, the collection wait time determining portion 5d determines the collection wait time for each of the host apparatuses 8, and moves the process to step S2. The collection wait time is a time period from a time when the execution of the print process is completed to a time when the print 9 is taken out from the discharge tray 11.

Specifically, when the execution of the print process is completed, the collection wait time determining portion 5d starts to measure a continuous time period for which a state where the print sensor 12 detects the print 9 continues, the continuous time period being recognized as the collection wait time. It is noted that the time when the continuous time period ends is a time when the state where the print sensor 12 detects the print 9 changes to a state where the print sensor 12 does not detect the print 9.

Step S8

In step S8, the main control portion 5a determines whether or not a predetermined end condition for ending the communication adjustment mode is satisfied. Upon determining that the end condition is satisfied, the main control portion 5a moves the process to step S9. Otherwise, the main control portion 5a moves the process to step S6.

It is noted that in step S6, in a case where the print process has not been executed in the first place, namely, in a case where the print sensor 12 has not detected the print 9 in the first place, the collection wait time determining portion 5d moves the process to step S2.

For example, the end condition is composed: a condition that a continuous time period for which the communication adjustment mode continues has become longer than a predetermined reference time period; a condition that no job data J0 to be processed is left; and a condition that the image forming apparatus 10 is not in communication with another apparatus.

Step S9

In step S9, the communication setting portion 5e selects, as an adopted communication method, one of the two candidate methods based on the result communication speed for each of the host apparatuses 8, and moves the process to step S10.

In the present embodiment, the communication setting portion 5e selects, as the adopted communication method, one of the two candidate methods based on the result communication speed, the amount of received data, and the collection wait time for each of the host apparatuses 8.

Specifically, the communication setting portion 5e selects, as the adopted communication method, one of the two candidate methods based on the result communication speed of one or more target host apparatuses that are one or more of the host apparatuses 8 in which the amount of received data is larger than a predetermined reference data amount and in which the collection wait time is shorter than a predetermined reference time period.

For example, in a case where the result communication speed of at least one target host apparatus is higher than a predetermined reference speed, the communication setting portion 5e selects the high-speed communication method as the adopted communication method. Otherwise, the communication setting portion 5e selects the low-speed communication method as the adopted communication method.

For example, the reference speed is obtained by multiplying an average result communication speed in communications by the low-speed communication method by one or more predetermined coefficients.

In a case where a plurality of result communication speeds are recorded in association with a host apparatus 8, a representative value such as an average value or a maximum value of the plurality of result communication speeds is used to select the adopted communication method. Similarly, in a case where a plurality of amounts of received data are recorded in association with a host apparatus 8, a representative value such as an average value or a maximum value of the plurality of amounts of received data is used to select the adopted communication method.

Similarly, in a case where a plurality of collection wait times are recorded in association with a host apparatus 8, a representative value such as an average value of the plurality of collection wait times is used to select the adopted communication method.

In addition, in a case where there is no target host apparatus, the communication setting portion 5e selects the low-speed communication method as the adopted communication method.

In a case where the amount of received data is small, adoption of the low-speed communication method does not impair the convenience of the user since a time required to receive the data is relatively short. Similarly, in a case where the collection wait time is long, adoption of the low-speed communication method does not impair the convenience of the user. As a result, a host apparatus 8 in which the amount of received data is small and the collection wait time is long, is excluded from the target host apparatuses.

Step S10

In step S10, the communication setting portion 5e establishes a communication with the switching hub 800 by the adopted communication method selected in step S9, and moves the process to step S11.

In step S10, the communication setting portion 5e releases a communication connection that has been established with the switching hub 800, and then newly establishes a communication by the adopted communication method.

However, in a case where the communication method that has been established between the image forming apparatus 10 and the switching hub 800 at a time point of execution of step S10 is the same as the adopted communication method, the process of step S10 is skipped.

Step S11

In step S11, the main control portion 5a changes the operation mode to the normal mode and ends the job control in the communication adjustment mode.

In the normal mode, the control device 5 performs a process to receive the job data J0 by making a communication by the adopted communication method.

In addition, in a case where the adopted communication method in the normal mode is the low-speed communication method, the CPU 51 executes the processes of steps S2, S3, and S5 to S7 shown in FIG. 2, and skips the processes of steps S1, S4, and S8 to S11.

In addition, in a case where the adopted communication method in the normal mode is the high-speed communication method, the CPU 51 executes the processes of steps S2 to S7 shown in FIG. 2, and skips the processes of steps S1 and S8 to S11.

As described above, in a case where the job data J0 is received from the host apparatuses 8 via the switching hub 800, the image forming apparatus 10 secures the convenience of the user while achieving power saving.

First Application Example

Next, a description is given of a first application example of the image forming apparatus 10.

In step S9 of FIG. 2, the communication setting portion 5e of the present application example selects the adopted communication method without using the collection wait time.

Specifically, the communication setting portion 5e selects, as the adopted communication method, one of the two candidate methods based on the result communication speed of the target host apparatuses that are host apparatuses 8 in which the amount of received data is larger than the reference data amount.

Second Application Example

Next, a description is given of a second application example of the image forming apparatus 10.

In step S9 of FIG. 2, the communication setting portion 5e of the present application example selects the adopted communication method without using the amount of received data and the collection wait time.

Specifically, the communication setting portion 5e sets, as the target host apparatuses, all host apparatuses 8 from which result communication speeds were obtained. Subsequently, the communication setting portion 5e selects, as the adopted communication method, one of the two candidate methods based on the result communication speeds of the target host apparatuses.

Third Application Example

Next, a description is given of a third application example of the image forming apparatus 10.

In step S9 of FIG. 2, the communication setting portion 5e of the present application example selects the adopted communication method without using the amount of received data.

Specifically, the communication setting portion 5e sets, as the target host apparatuses, host apparatuses 8 in which the collection wait time is shorter than the reference time period. Subsequently, the communication setting portion 5e selects, as the adopted communication method, one of the two candidate methods based on the result communication speeds of the target host apparatuses.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus that receives job data from one or more host apparatuses via a switching hub and executes a print process based on the job data, the image forming apparatus comprising:
   a speed calculating portion configured to, in a state where a communication with the switching hub has been established by a highest-speed candidate method among a plurality of candidate methods that respectively have different rated communication speeds, calculate a result communication speed for each of the one or more host apparatuses based on an amount of the received job data and a reception required time for each of the one or more host apparatuses, the candidate methods being candidates for a communication method to be adopted; and
   a communication setting portion configured to select, as an adopted communication method, one of the plurality of candidate methods based on the result communication speed for each of the one or more host apparatuses, and establish a communication with the switching hub by the adopted communication method;
   a print sensor configured to detect a print on a discharge tray that receives the print that has been obtained by an execution of the print process; and
   a collection wait time determining portion configured to, upon a change in a detection result of the print sensor after the execution of the print process, determine a collection wait time for each of the one or more host apparatuses,
   the collection wait time being a time period from a time when the execution of the print process is completed to a time when the print is taken out from the discharge tray, wherein the communication setting portion selects, as the adopted communication method, one of the plurality of candidate methods based on the result communication speed and the collection wait time for each of the one or more host apparatuses.

2. The image forming apparatus according to claim 1, wherein the communication setting portion selects, as the adopted communication method, one of the plurality of candidate methods based on the result communication speed of one of the one or more host apparatuses in which the amount of the received job data is larger than a predetermined reference data amount.

3. The image forming apparatus according to claim 1, wherein the communication setting portion selects, as the adopted communication method, one of the plurality of candidate methods based on the result communication speed of one of the one or more host apparatuses in which the collection wait time is shorter than a predetermined reference time period.

* * * * *